June 15, 1926. 1,589,072
J. E. HAMACHECK
HUMIDIFYING AND AIR PURIFYING APPARATUS
Filed July 23, 1925
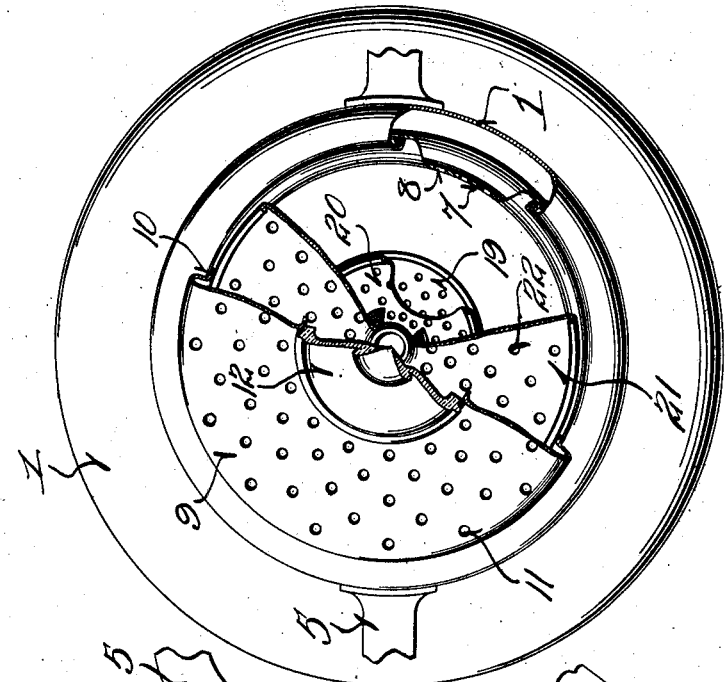
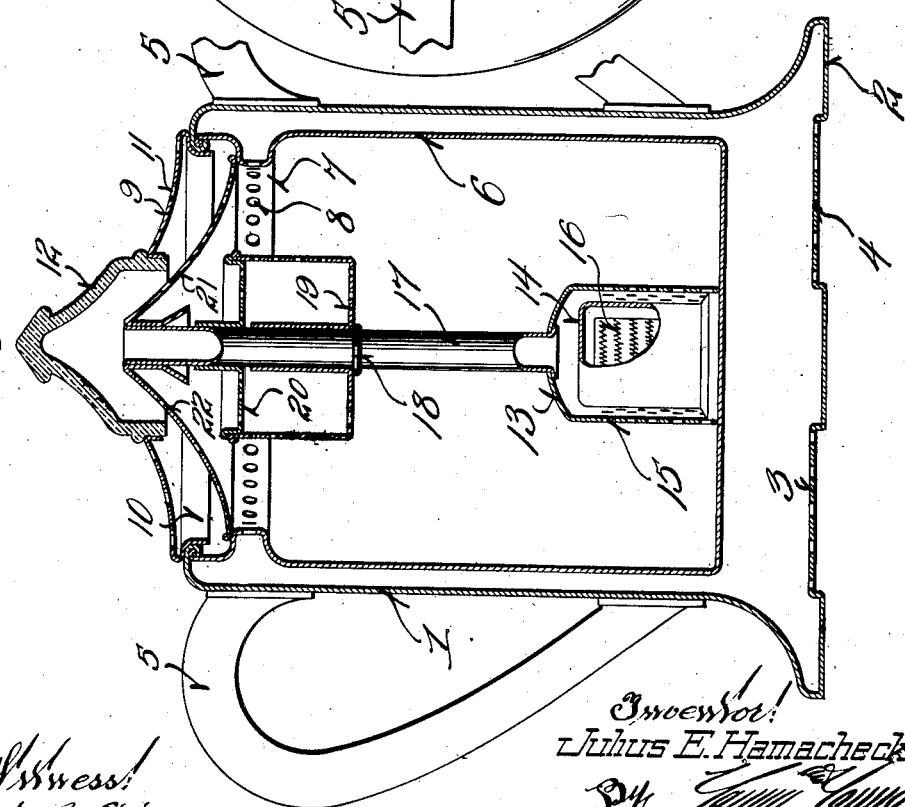

Patented June 15, 1926.

1,589,072

UNITED STATES PATENT OFFICE.

JULIUS E. HAMACHECK, OF TWO RIVERS, WISCONSIN, ASSIGNOR TO METAL WARE CORPORATION, OF TWO RIVERS, WISCONSIN.

HUMIDIFYING AND AIR-PURIFYING APPARATUS.

Application filed July 23, 1925. Serial No. 45,638.

This invention relates to humidifying and air purifying apparatus.

Objects of this invention are to provide an apparatus which will humidify air and at the same time will mix with the humid air any volatile material desired to produce either a disinfecting action or to produce a scenting action for imparting fragrant odors to the air in a room.

Further objects are to provide an apparatus which is attractive and ornamental in its appearance and is of relatively small size, although functioning in the manner noted above, and which can be very simply operated by supplying heat thereto, for example by means of an electric heating element embodied in the device.

An embodiment of the invention is shown in the accompanying drawings, in which:—

Figure 1 is a vertical sectional view through the device.

Figure 2 is a plan view thereof with parts broken away to show the interior construction.

The device comprises an outer shell or casing 1 which has a flared bottom provided with feet 2 and with raised portions 3, such raised portions being provided with a plurality of apertures 4. This casing is provided with one or more handles 5; for example, a pair of handles may be provided to give a balanced and pleasing appearance to the apparatus and to facilitate its handling. An inner compartment or shell 6 is provided and is suspended from the inturned edges of the outer shell 1, as shown in Figure 1. This inner compartment or shell is preferably provided with an inwardly pressed portion 7 which is provided with a plurality of apertures 8. An apertured cover 9 is provided with a downwardly extending flange 10 which fits into the upper opening of the device. This cover is in the shape of a truncated cone and is provided with a plurality of apertures 11. It may be equipped with a glass top 12 similar to the top employed in coffee percolators.

Within the main casing 1, a percolating or pumping attachment is provided and consists of a lower shell 13 within which a small shell 14 is positioned, the shell 13 being apertured, as indicated at 15. The inner shell carries an electric heating element 16, as indicated in Figure 1. A tube 17 extends upwardly from the shell 13 and is provided with a bead 18 upon which the apertured compartment or basket-like member 19 rests, such basket-like member being provided with a movable perforated top 20. The upper end of the tube 17 carries a conical member 21 provided with a plurality of apertures 22.

In using the device, the compartment 6 is partly filled with water and the incense, deodorizing material or disinfecting material is positioned within the basket 19. The electric heater is energized and steam and water are pumped upwardly through the tube 17 and their flow reversed by the glass cap 12. The descending stream of hot water and steam passes over the cone 21 and flows through the apertures 22 back into the compartment 6. At the same time the air between the outer shell or jacket 1 and the inner compartment 6 is heated and rises, fresh air being supplied through the apertures 4 in the raised portions 3 of the base. This heated air passes upwardly through the apertures 8 into the upper portion of the compartment 6 and is intimately mixed with the steam and with the volatile agents. It passes through the apertures 22 in the cone 21 and outwardly through the apertures 11 in the cover. This heated air is, therefore, thoroughly saturated with moisture and with the volatile agents.

It will be seen that an apparatus has been provided for disinfecting, deodorizing or perfuming the air in a room and for humidifying the air to the desired extent. When it is considered that disinfecting takes place most effectively in relatively moist air, it is apparent that this apparatus is highly effective for this purpose, and also for perfuming or deodorizing. It is apparent that heated, moist air will quickly diffuse through the room and the desired result is accomplished.

It will be noted further that the apparatus is relatively small and compact and may be operated by an unskilled person without any danger of fire or other hazards. Further, it is to be noted that the apparatus may be cheaply manufactured and is of attractive and pleasing appearance.

Although the invention has been described in considerable detail, it is to be understood that the invention may be variously embodied and is, therefore, to be limited only as claimed.

I claim:

A device of the class described comprising a liquid receiving compartment, an outer shell spaced therefrom and having air entrance apertures adjacent its lower portion, said liquid receiving compartment having apertures for the entrance of air adjacent its upper portion, a shell positioned within said liquid holding compartment and having entrance openings for said liquid, means for heating the liquid within said shell, a tube extending upwardly from said shell and adapted to conduct liquid and steam upwardly, means for distributing said liquid, and a basket for receiving volatile agents positioned below said means and through which said liquid is adapted to percolate.

In testimony that I claim the foregoing I have hereunto set my hand at Two Rivers, in the county of Manitowoc and State of Wisconsin.

JULIUS E. HAMACHECK.